United States Patent [19]

Tomasini et al.

[11] Patent Number: 5,509,069
[45] Date of Patent: Apr. 16, 1996

[54] SPLITTING OF A SUPPLY CURRENT DRAWN FROM A TELECOMMUNICATION SYSTEM'S LINE AMONG A PLURALITY OF USER'S CIRCUITS

[75] Inventors: Luciano Tomasini, Monza; Rinaldo Castello, Arcore, both of Italy

[73] Assignee: SGS-Thomson Microelectronics S.r.l., Agrate Brianza, Italy

[21] Appl. No.: 121,294

[22] Filed: Sep. 14, 1993

[30] Foreign Application Priority Data

Sep. 16, 1992 [EP] European Pat. Off. .............. 92830498

[51] Int. Cl.[6] .................................................. H04M 19/00
[52] U.S. Cl. ............................ 379/413; 379/324; 379/399
[58] Field of Search ...................................... 379/413, 399, 379/418, 324

[56] References Cited

U.S. PATENT DOCUMENTS 4,813,072  3/1989  Moses et al. ............................ 379/388

FOREIGN PATENT DOCUMENTS 0328462  8/1989  European Pat. Off. .
3543798  3/1987  Germany .

OTHER PUBLICATIONS

TN Nachrichten, No, 91, 1987, Frankfurt, DE, pp. 3–14, Krämer et al., "TN–Terminals im neuen Design".

Primary Examiner—Jeffery Hofsass
Assistant Examiner—Jacques M. Saint-Surin
Attorney, Agent, or Firm—David M. Driscoll; James H. Morris; Brett N. Dorny

[57] ABSTRACT

A circuit is provided in telecommunication terminal equipment for splitting a limited supply of current received from a subscriber's line current among a plurality of functional circuits according to their priority rank. The circuit uses a differential pair of current delivering transistors and a special circuit to monitor the actual current of absorption of at least the functional circuit of highest rank to produce a control signal that is used for modifying the drive conditions of the current delivering transistors. All current exceeding the actual absorption needs of the highest rank functional circuit is distributed to the other functional circuits and the prior art practice of sinking unneeded current through a dissipative shunt voltage regulator associated with each functional circuit is avoided. This same principle may be advantageously applied also to functional circuits of progressively lesser rank of priority.

9 Claims, 2 Drawing Sheets

SPLITTING OF A SUPPLY CURRENT DRAWN FROM A TELECOMMUNICATION SYSTEM'S LINE AMONG A PLURALITY OF USER'S CIRCUITS

BACKGROUND OF THE INVENTION

1. Field of the Invention

The present invention relates to the powering of a plurality of functional circuits within a telephone or other terminal device, through a subscriber's line of a telecommunication system, such as a telephone network, and, in particular, to a system for splitting a limited amount of supply current received from the line among a plurality of functional circuits in a terminal device, such as a telephone, capable of being powered through the line.

2. Discussion of the Related Art

In certain telecommunication networks and typically in wired telephone systems, a plurality of functional circuits, e.g. the speech circuitry, the dialling circuit, etc. of a telephone, must be capable of functioning with electrical power made available through the subscriber line by a dedicated battery installed in a remote switching station. Commonly, within an apparatus connectable through a user's line to a central system, there is a circuit dedicated to oversee the derivation from the line of a DC current necessary for powering the various functional circuits at respective stabilized supply voltages.

In a prior U.S. patent application Ser. No. 07/991,564, filed on Dec. 16, 1992, by the present applicant, an improved stabilized voltage power supply circuit for functional circuits of a subscriber's apparatus is disclosed. The circuit derives a current from the line and is capable of ensuring a reduced voltage "droop", i.e. a low voltage drop along the path between the physical connection point of the apparatus to the line and the point where a certain current is absorbed at a stabilized voltage by a certain functional circuit of the subscriber's apparatus. The bifilar subscriber's line normally constitutes also a signal path in these telecommunication systems. An important aspect of the practice of powering several user's circuits through a bifilar line, which has a nonnegiigeable influence on the global power consumption of the system, is represented by the manner in which a given amount of current that may be derived from the subscriber's line (normally a major portion of it) is eventually split among a plurality of functional circuits to be powered in the apparatus. The splitting must necessarily take place in respect of a certain predefined order of priority or rank of the various circuits. A typical example of this recurrent situation is represented by the subscriber's side speech circuits, where a dedicated circuit present in the telephone derives a current from the telephone line and distributes it, partially for powering itself, partially for powering logic control circuits, partially for powering an eventual microprocessor, partially for powering a circuit overseeing the so-called amplified-listening mode (if present in the telephone) and so forth among a plurality of functional circuits. Each of these functional circuits may have a maximum design current absorption and, in such an operating range, it may have a variable instantaneous current absorption depending on the actual working conditions. Depending on the functional characteristics and conditions of the various circuits and the interactions among the circuits, a certain rank of priority is assigned to each circuit and is used to determine the possibility of that circuit receiving power via the circuit overseeing the splitting of the available DC current derived from the line.

Commonly, in normal systems, the subdivision of the available supply current is performed taking into account the rank of priority of the various functional circuits, in the sense that current is supplied first to the circuit ranking higher in priority and so forth to all the other circuits in a decreasing order of priority as far as there is an adequate availability of supply current. For each user's circuit a maximum current absorption is set at the design stage and according to the known technique each of them will absorb in practice such a maximum current whenever they are activated. In other words, the available line current, that is the current which is derived by a certain subscriber $I_L$, is split so as to supply current to the functional circuit of highest rank for a maximum current absorption of that particular circuit. The remaining current is made available to a second functional circuit of a lower rank for its maximum design current absorption value and the remaining current may then be made available to a third functional circuit of lower rank and so forth. This common system of splitting the available supply current among a plurality of functional circuits of different rank, may be expressed by the relationship:

$$I_L = I1\max + I2\max + I3\max + \ldots$$

where $I_L$ is the total current which is derived from the line.

This way of managing the splitting of the supply current is not always efficient. For example, if the current which is actually absorbed by a certain functional circuit of the apparatus connected to the line has a relatively low stand-by value (DC) and relatively large absorption peaks (AC), a remarkable waste of current may occur.

OBJECTIVE AND SUMMARY OF THE INVENTION

A main objective of the present invention is to provide an improved method for splitting a supply current derived from a subscriber's line among a plurality of functional circuits of a local installation or equipment corrected to the line and a current splitting circuit, which implements such a novel method.

Basically, the system of the invention employs a dedicated circuit functionally connected across the supply nodes of the functional circuit of highest rank and optionally (and more preferably) also across the supply nodes of the other functional circuits of decreasing rank. Such a dedicated circuit monitors the current which is effectively absorbed at any instant by the respective functional circuit and diverts any current that at the moment is in excess of the effective absorption of such a functional circuit to a functional circuit or to the functional circuits of lower rank, without sinking the excess current toward a virtual ground node of the functional circuit, as is customarily done in the systems of the prior art.

For example, the circuit of the invention may sense an eventual rise of the regulated supply voltage of such a first functional circuit of highest rank as a consequence of a drop of the current that is being actually absorbed by the functional circuit itself, and generates a control signal. Such a control signal is utilized as a "feedback" signal for modifying the dynamic behavior of a differential current-dividing stage of the supply circuit of the instant invention. According to a first embodiment of the invention, said control signal may be used for generating an offset between the control nodes of said differential stage in order to proportionally decrease the current delivered to said first functional circuit and increase the current which is delivered to a second (or to other) functional circuit and vice versa.

Such an offset type current-splitting circuit permits in practice to switch even the whole supply current from a first to a second (in rank) functional circuit (or to all the circuits that come after the first functional circuit of highest rank). In fact, by making said differential, current-dividing stage with a pair of bipolar junction transistors (BJT), an offset voltage of just about 100 mV is sufficient to determine a ratio of about 90:1 between the currents delivered through the two transistors of the differential pair to two distinct functional circuits.

Naturally, according to the system of the invention, all the current that a functional circuit of highest rank may absorb will be derived from the line (if available) as needed, and this amount obviously will reduce the residual amount of supply current which may be delivered to functional circuits of lower rank. The system of the instant invention prevents the waste of current that was determined in known systems, which delivers to any functional circuit its maximum design current, by sinking any current that may be temporarily in excess of the actual absorption of the powered functional circuit through a voltage stabilizing shunt networks.

Of course, the effectiveness of the circuit of the invention in producing a valuable energy saving will manifest itself and become remarkable as more frequent will be the occasions in which the highest rank functional circuit, and also the other circuits of decreasing rank, will be subject to temporary conditions of relatively low current absorption.

BRIEF DESCRIPTION OF THE DRAWINGS

The different aspects which characterize the invention and the relative advantages will become more evident through the following description of several embodiments and by referring to the drawings, wherein.

DETAILED DESCRIPTION

Figure 1:
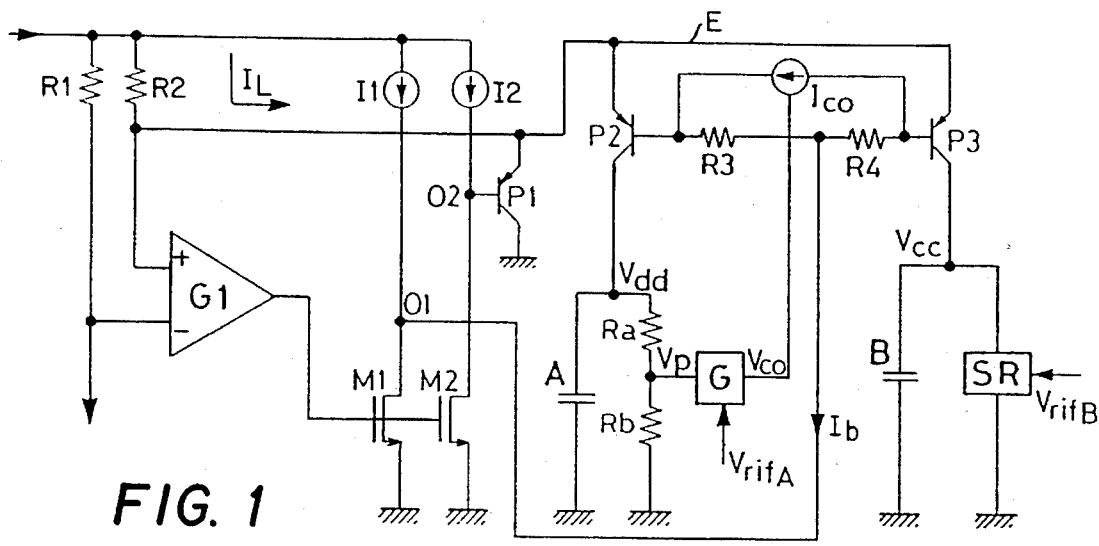
FIG. 1 is a basic diagram of a circuit for supplying and dividing a given limited amount of supply current among a plurality of functional circuits, which is provided with an offset-type control circuit according to the present invention.

With reference to FIG. 1, a supply circuit of a user's equipment connected to a bifilar line, (e.g. a subscriber's telephone line) comprises an input circuit, which may be substantially similar to the circuit described in said prior U.S. patent application, Ser. No. 07/991,564. Basically, such an input circuit comprises two resistors: R1 and R2, an operational amplifier G1 that drives two output stages: a first one composed of the current generator I1 and the MOS transistor M1 and the other of the current generator I2 and the MOS transistor M2. The description of an input circuit of this type, contained in said above-identified prior patent application Ser. No. 07/991,564, is herein incorporated by express reference. The bifilar line is symbolically represented in all the figures by the wire $V_L$ and by the ground node shown. In practice, in a telephone both the (virtual) ground node as well as the node $V_L$ may be functionally connected to the pair of real wires of the subscriber's telephone line through other circuits which may also be external to the integrated circuit containing the power supply circuit. These intervening circuits are not shown in the figures to avoid overburdening the drawings, in consideration of the fact that the eventual presence of these intervening circuits is substantially irrelevant as far as the function of the circuit of the instant invention, is concerned.

The supply current $I_L$, which may be drawn from the line for powering the various functional circuits of the user's apparatus, is delivered through the resistance R2 of the input circuit.

Commonly, in the circuits of the prior art, and similarly also in the circuit, improved under different aspects, disclosed in the above-identified prior patent application, across each functional circuit, i.e. connected in parallel to the functional circuit to the respective supply nodes thereof, there is a shunt regulator SR, capable of maintaining constant the voltage across said supply nodes within a certain range of current absorption. These shunt regulators are intrinsically dissipative circuits, being based upon the principle that each functional circuit provided with its shunt regulator will absorb a predetermined maximum design current from the line.

By contrast, the circuit of the present invention is characterized by the fact that at least the functional circuit of highest rank is provided with a circuit capable of detecting the current that is really drawn by the functional circuit and to generate a first signal Vco, which controls an offset current generator Ico for a differential pair of current delivering transistors P2 and P3, used for splitting a supply current drawn from the line between said first functional circuit and an eventual second functional circuit or several other functional circuits of lower rank, as will be described in more detail hereinbelow.

The role of the two output stages of the input circuit is as follows. When the output stage 02 is active, i.e. when the line voltage $V_L$ is lower than the sum of the nominal regulated supply voltage of the first functional circuit to be powered (e.g. Vdd), of the Vcesat of transistor P1, and the voltage drop VR2 across the resistance R2 (i.e. $V_L$ <Vdd+ Vcesat+VR2), then transistor P1 conducts and all the current $I_L$ drawn from the line flows to ground. In this manner, the whole right-hand portion of the circuit of FIG. 1, i.e. all the functional circuits, remains powered exclusively by the electrical charge which is stored in the respective storage capacitors. On the other hand, when the output 01 is active, i.e. when the line voltage $V_L$ is greater than the sum of the regulated supply voltage (e.g. Vdd) of the first functional circuit, the Vcesat of the respective current delivering transistor P2, and the voltage drop VR2 across resistor R2 (i.e. $V_L$>Vdd+Vcesat+VR2), transistor P1 switches off thus allowing the line current $I_L$ to be distributed among to the various functional circuits.

For simplifying the illustration, the different functional circuits are schematically indicated in all the figures by as many storage capacitors of electrical charge: A, B, C, D, . . . , in a decreasing order of rank. In parallel with the functional circuits of relatively lower rank (B, C, . . . ) may be present a shunt regulator SR of any known type, as commonly used in the systems of the prior art, capable of keeping constant the voltage across its nodes, i.e. the regulated supply voltage of the respective functional circuit, e.g. (Vdd, Vcc, . . . ), according to the design value, by means of a relative reference voltage (Vrif$_B$, Vrif$_C$, ...) functionally applied to an input of the shunt regulator SR.

At least across the functional circuit A of highest rank in terms of priority of supply (FIGS. 1, 2, 3 and 5) or also across the other functional circuits of lower rank, with the exclusion of the lowest rank circuit (FIG. 4), in place of a shunt regulator SR, a voltage monitoring network composed substantially of a voltage divider Ra–Rb, is functionally connected across the supply nodes of the respective functional circuit.

The voltage Vp, present on the intermediate node of the voltage divider Ra–Rb, is a signal representative of the voltage which is present on the supply node of the functional circuit and this signal is fed to an input of a circuit block G. Block G also has a second input to which a reference voltage (e.g. Vrif$_A$) may be applied.

Block G may represent any circuit capable of generating on an output node a signal proportional to the difference between the voltage Vp and the reference voltage (e.g. Vrif$_A$). Of course many known circuits will provide such a function and may be used for the block G. For example, the circuit of a difference amplifier using an operational amplifier, according to a well known network, is perfectly suitable as block G. In this case, a voltage Vco given by the following equation: Vc=(Vp–Vrif$_{(\ )}$) ×G, where G is thee voltage gain of the circuit, will be generated on the output node of the block G. Of course, as an alternative, a differential amplifier such as an operational amplifier capable of generating through the output node a current signal proportional to the difference between the voltage Vp and the reference voltage Vrif$_A$ fed to the inputs of the differential amplifier, may also be used.

According to a first embodiment of the invention, shown in FIG. 1, control signal Vco generated by the block G is fed to a control terminal of offset current generator Ico, to force this generator to deliver a current which is a function of the control signal Vco. Such an offset current, by circulating through the resistance R3 and R4 generates an offset voltage between the control nodes of a differential pair of transistors (P2 and P3 in FIG. 1). The bias conditions of this differential pair of transistors is established by connecting the intermediate node of connection between the two offsetting resistances R3 and R4 to the output node 01 of the input stage, thus forcing a biasing current Ib through the base of transistors P2 and P3.

The effect of such an offset voltage is that of modifying the drive conditions of the differential pair of transistors, P2 and P3. The pair of transistors splits a supply current derivable from the supply node E (FIG. 1) between functional circuits A and B. The conductivity of one transistor of the pair as compared with the conductivity of the other transistor increases or decreases as determined by the cause that produces such an offset voltage.

In practice, if for example the highest rank functional circuit A decreases its current absorption, thus causing a rise in the voltage Vp, the circuit will tend to attain a new equilibrium by increasing the current delivered to the functional circuit of lesser rank and decreasing the current delivered to the highest rank circuit. Therefore any excess current will be usefully made available to the circuits of lesser rank instead of sinking it to ground.

Figure 2:
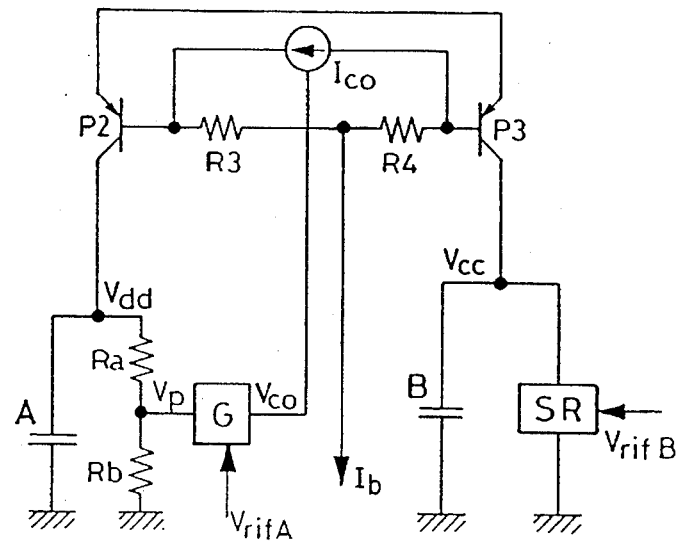
FIG. 2 is a view of the offset-type control circuit portion of the circuit of FIG. 1.

As it is put in more evidence in the partial view of the circuit of FIG. 2, according to this embodiment, the regulating signal Vco modifies the conductivity state of the two current delivering transistors P2 and P3, which are functionally connected between a common current supply node E and the functional circuits A and B, respectively, by reducing or increase the conductivity of the transistor P2 and simultaneously increasing or reducing the conductivity of the transistor P3.

Of course the offset-type, current-splitting circuit of the present invention may be advantageously used in different applications, taking into account the relative margins for energy saving which exist in practice.

Figure 3:
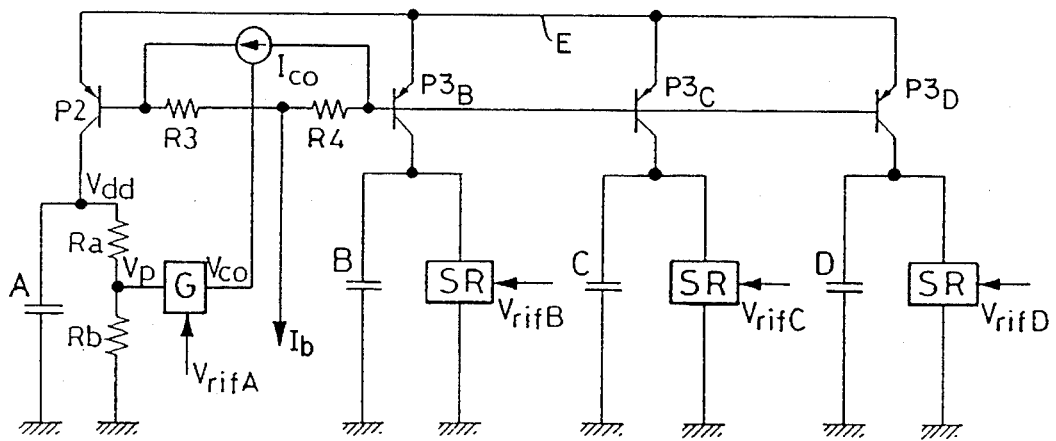
FIG. 3 shows a circuit for dividing a supply current among four functional circuits, according to a first embodiment of the invention.

With reference to FIG. 3, the offset type current splitting circuit of the invention may be applied exclusively to the highest rank functional circuit A. All the current exceeding the current which is really absorbed by the first functional circuit A, may then be divided in a "fixed" (indiscriminate) mode among all the other functional circuits (B, C, D). Each of the lower rank circuits may be provided by a common shunt regulator (i.e. a dissipative voltage regulator).

Figure 4:
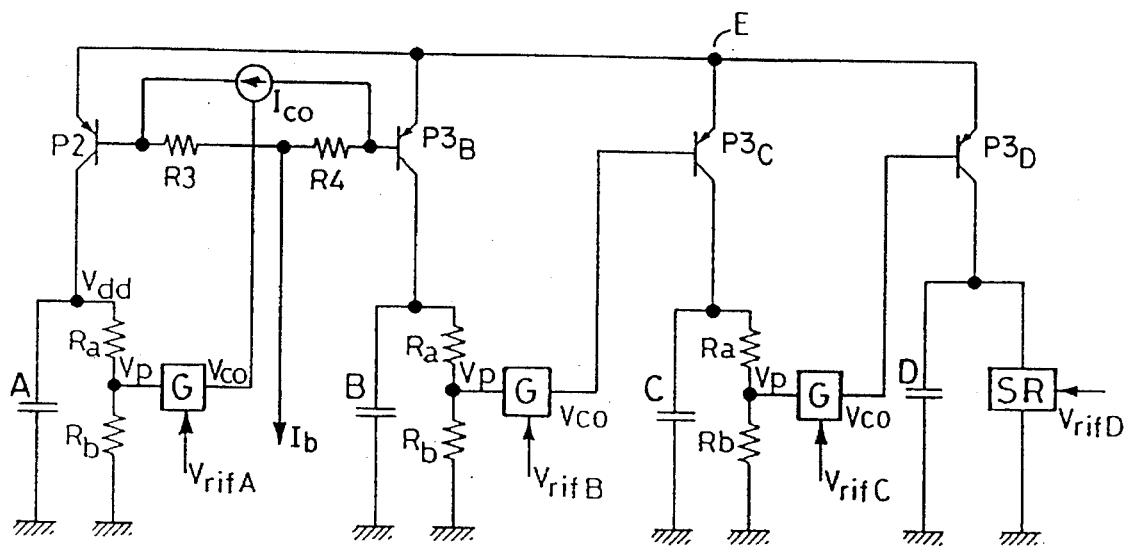
FIG. 4 shows an alternative embodiment of the invention for splitting a supply current among four functional circuits.

Alternatively, as shown in FIG. 4, when the peculiar characteristics of the application warrant it, a non-dissipative, current delivering circuit may be provided also to others or to all the subsequent functional circuits of lesser and lesser rank (i.e. A, B, C) with the exception of the lowest rank circuit (i.e. D), which will be provided eventually with a normal dissipative shunt regulator SR. In the case of these other functional circuits, the control signal Vco generated by the respective block G, and given by: Vco=Vp–Vrif$_{(\ )}$)×G may be directly used for driving a current delivering transistor which controls the current that is delivered to the respective functional circuit.

Figure 5:
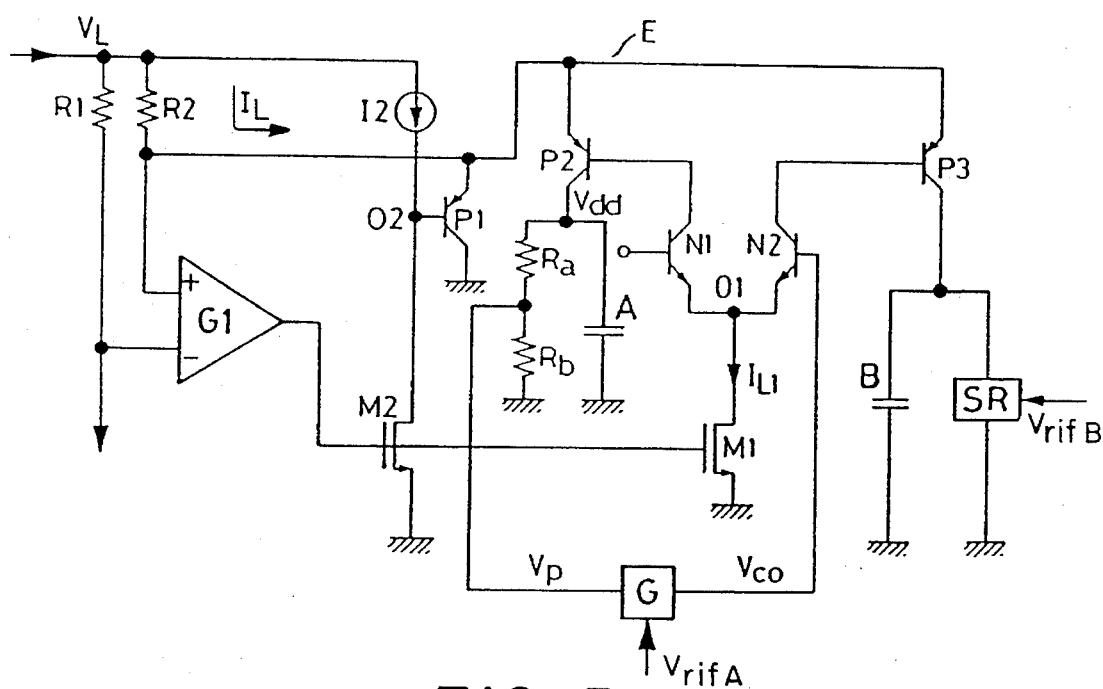
FIG. 5 shows another alternative embodiment of the invention.

An alternative embodiment of the current splitting circuit of the present invention is depicted in FIG. 5.

According to this alternative embodiment, the role of the MOS transistor M2 and of the current generator I2, i.e. of the single output stage driver by the operational amplifier G1 of the input circuit, is substantially identical to that of the same elements of the input circuit shown FIG. 1.

According to this alternative embodiment, a second differential pair of transistors composed of the transistors N1 and N2 is introduced. The transistors N1 and N2 actually drive the transistors P2 and P3 of the first differential pair of transistors, which actually splits and delivers the supply current drawn from the line through the resistance R2, to the respective functional circuits A and B.

The operation of the circuit is as follows. By supposing that the voltage Vp, present on the intermediate node of the voltage divider Ra–Rb and given by the equation: Vp=Vdd× Ra/(Ra+Rb), rise because of a diminished current absorption of the functional circuit A of highest rank, the signal Vco, generated at the output of the block G, rises by an amount given by the equation: Vco=(Vp–Vrif) ×G. This tends to unbalance the differential pair of transistors N1 and N2 in the sense of increasing the current through the transistor N2 and thus force a higher current through the base of the transistor P3. The accompanying increase of the emitter current of the transistor P3 and decrease of the emitter current the other current delivering transistor P2 bring the supply current splitting circuit to reach a new equilibrium condition whereby all the current in excess of the current which is really absorbed by the highest rank functional circuit A is usefully transferred to the functional circuit B of lesser rank without any waste. The differential pair of transistors N1 and N2, used in this way, provide a functional equivalent of the offset current generator described above, controlling the offset between the control inputs of the differential pair of transistors P2 and P3. Each of transistors N1 and N2 may be referred to as an "offset control transistor" having an "offset control terminal".

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A method of splitting a given supply current received from a subscriber's line among a plurality of functional circuits having a certain priority rank, comprising the steps of:

delivering through use of an offsetable circuit, a supply current to a first functional circuit of highest rank of priority in an amount as absorbed by said first functional circuit; and delivering all of a first remaining portion, being all of said given supply current in excess of current absorbed by said first functional circuit, to a remaining circuit which includes a second functional circuit.

2. A method of splitting a supply current, received from a subscriber's line, among a plurality of functional circuits, each circuit having a priority rank, comprising the steps of:

delivering, through use of an offsettable circuit, a first portion of said supply current to a first functional circuit of highest rank of priority, said first portion of said supply current being just sufficient to power said first functional circuit, leaving a first remaining portion of said supply current; and delivering all of said first remaining portion to a remaining circuit which includes a second functional circuit.

3. A method according to claim 1, wherein delivering all of said first remaining portion includes the steps of:

delivering a next portion of a remaining portion to a next lower priority functional circuit, said next portion being in an amount as absorbed by said next lower priority functional circuit, leaving a next remaining portion;

repeating the step of delivering a next portion until a remaining portion is insufficient to power a next lower priority functional circuit, if said supply current is insufficient to power all functional circuits; and repeating the step of delivering a next portion until all functional circuits are powered and sinking to ground any residual next remaining portion, if said supply current is sufficient to power all functional circuits.

4. A method according to claim 1, further comprising the steps of:

generating a first signal representative of current absorbed by said first functional circuit;

generating a second signal representative of the difference between said first signal and a reference signal;

utilizing said second signal as an offsetting signal for a differential pair of current delivering transistors having a first transistor and a second transistor;

delivering current from said first transistor to said first circuit; and delivering current from said second transistor to a second functional circuit.

5. A method according to claim 4, further comprising the steps of:

generating a third signal representative of current absorbed by said second functional circuit;

generating a fourth signal representative of the difference between said third signal and a reference signal;

utilizing said fourth signal to drive a transistor to deliver current to a third functional circuit of lesser priority rank than said second functional circuit.

6. A supply current splitting and delivering circuit for splitting a supply current received from a subscriber's line and delivering portions of said supply current to a plurality of functional circuits, each functional circuit having a priority rank, said supply current splitting and delivering circuit comprising:

a differential pair of current delivering transistors, having a first transistor with a first control terminal and a second transistor with a second control terminal, said first transistor being connected between a delivery node of said supply current and a supply node of a first functional circuit, said second transistor being connected between said delivery node of said supply current and a supply node of a second functional circuit of lesser rank than said first functional circuit;

a first offset control signal circuit means for generating a first offset control signal proportional to the difference between a signal representative of the supply voltage at said supply node of said first functional circuit and a reference signal; and offset circuit means for receiving said first offset control signal and for producing an offset between a drive voltage present on said first control terminal and a drive voltage present on said second control terminal.

7. A circuit according to claim 6, wherein said offset circuit means include an offset current generator and a pair of series-connected resistors, said offset current generator connected between said first control terminal and said second control terminal, and said pair of series-connected resistors also connected between said first control terminal and said second control terminal.

8. A circuit as defined in claim 6, wherein said offset circuit means include a differential pair of offset control transistors, having a first offset control transistor with a first offset control terminal and a second offset control transistor with a second offset control terminal, said first offset control transistor connected to drive said first control terminal and said second offset control transistor connected to drive said second control terminal, said first offset control terminal connected to receive a reference signal, said second offset control terminal connected to receive said first offset control signal.

9. A circuit according to claim 6, further comprising:

a third transistor connected between said delivery node of said supply current and a supply node of a third functional circuit of lesser rank than said second functional circuit, said third transistor having a third control terminal; and a second offset control signal circuit means for generating a second offset control signal proportional to the difference between a reference signal and a signal representative of the supply voltage at said supply node of said second functional circuit;

wherein said third control terminal is connected to receive said second offset control signal.

* * * * *